May 16, 1967     T. SLONCZEWSKI     3,319,426
EQUIPMENT FOR AND METHOD OF RETRIEVING UNDERWATER CABLE
Filed Sept. 11, 1962     4 Sheets-Sheet 1

INVENTOR
T. SLONCZEWSKI
BY
Stoddard
ATTORNEY

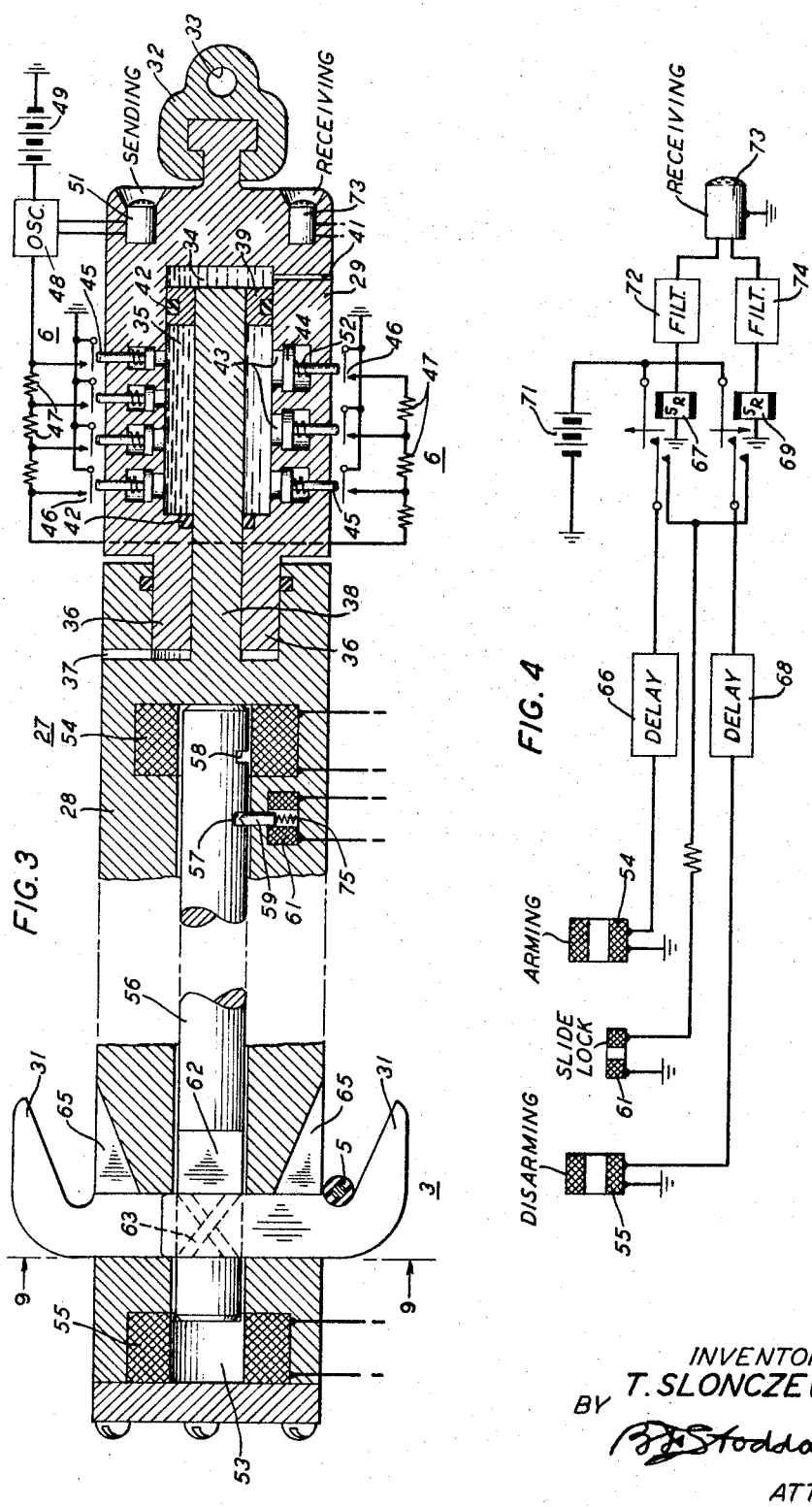

May 16, 1967 T. SLONCZEWSKI 3,319,426
EQUIPMENT FOR AND METHOD OF RETRIEVING UNDERWATER CABLE
Filed Sept. 11, 1962 4 Sheets-Sheet 4

INVENTOR
T. SLONCZEWSKI
BY
Stoddard
ATTORNEY

United States Patent Office 3,319,426
Patented May 16, 1967

3,319,426
EQUIPMENT FOR AND METHOD OF RETRIEVING UNDERWATER CABLE
Thaddeus Slonczewski, Summit, N.J., assignor to Bell Telephone Laboratories, Incorporated, New York, N.Y., a corporation of New York
Filed Sept. 11, 1962, Ser. No. 222,915
9 Claims. (Cl. 61—72.3)

This invention relates to grappling equipment for retrieving underwater cable and, more particularly, to a method and apparatus for expediting the retrieval of cable laid in deep water. More specifically, the invention relates to grappling equipment having means for signaling a cable-recovery ship that the grapnel is in the proximity of a desired cable and for also signaling that the grapnel has engaged the cable. The invention further relates to means for normally maintaining a grapnel in an inoperative condition except when it is in the proximity of a particular cable which is to be retrieved.

Various types of cable have been laid beneath the surfaces of bodies of water. For example, a large number of telephone and telegraph communication cables extending between different continents have been laid on the floor of the ocean. After a cable has been laid on the bed of a body of water, it may subsequently develop a fault or it may become damaged by various causes, such as by the action of marine organisms or by becoming fouled in trawling gear operated by fishing boats. Thus, any one of a number of factors may render it desirable to find the cable and pull it up above the surface of the body of water so that it can be examined, repaired, or replaced. The process of finding the cable and pulling it up is called "cable-retrieval" or "cable-recovery."

In general, cables have been retrieved by means of a grapnel dragged by a cable-recovery ship. The first step in the process of retrieving a cable is to determine the approximate latitude and longitude of the cable. This can be accomplished by examining the operational record that was made when the cable was laid. After the approximate position of the cable has been found, a grapnel is lowered from the cable-recovery ship to this portion of the ocean floor. The next step is to grapple for the cable by sailing back and forth above this area while dragging the grapnel in directions that are at right angles to the estimated axial direction of the cable. When the cable is eventually caught or engaged by the grapnel, the grapnel and the cable are pulled up to the ship.

In order to determine when the grapnel has caught the cable, the cable-recovery ship usually carries an indicator for indicating an increase in the tension of the rope that connects the grapnel to the ship. However, when grappling operations are undertaken in deep water, such as in depths of two or three miles, it is usually very difficult to ascertain exactly when the grapnel has caught the cable. This is because the grapnel rope would have a length of several miles and would, therefore, have considerable weight and tension. In addition, the cable is generally laid with an appreciable amount of slack so that it can conform to irregularities, particularly depressions, in the contour of the ocean floor. Consequently, when the grapnel does engage the cable it may drag the cable a considerable distance before the tension indicator on the ship will produce an indication of a recognizable increase in the tension of the grapnel rope.

For this reason, it has often been necessary for a cable-recovery ship to drag a grapnel five miles off to one side of the estimated location of a cable before a decision could be made that the grapnel had failed to engage the cable. Then the ship had to be turned around and sailed back the same five miles to the suspected position of the cable. After this, the ship had to drag the grapnel an additional five miles off to the other side of the calculated location of the cable. These maneuvers were repeated until the grapnel eventually engaged the cable. Thus, it was necessary for the ship to travel back and forth ten miles in each direction a considerable number of times before the cable was caught. Obviously, such cable-retrieval operations were costly because they consumed considerable time on the part of the ship and its crew.

Accordingly, it is an object of this invention to provide improved means for retrieving underwater cable.

Another object of this invention is to provide means for sending signals through a body of water for indicating the approach of a grapnel to a particular cable which is to be retrieved.

An additional object of this invention is to provide means for sending signals through a body of water for indicating the engagement of a grapnel with a cable.

A further object of this invention is to provide means for normally maintaining a grapnel in an inoperative condition except when it is in the proximity of a desired cable.

Still another object of this invention is to provide a grapnel with improved means for holding and retaining an engaged cable so that the cable will not slip out of engagement with the grapnel.

These and other objects of the invention are attained by employing a magnetic detector which is carried in advance of a grapnel that is being dragged by a cable-recovery ship. This detector is designed to be responsive to the presence of a magnetic object. Accordingly, when the detector is brought into proximity to a cable, it responds by transmitting acoustic signals through the water to the cable-recovery ship. The ship is equipped with a receiver which responds to the reception of the acoustic signals by producing a shipboard indication thereof. Thus, the ship's operating personnel are informed that the grapnel is in the immediate vicinity of a cable.

In order to assist the detector in performing its function of locating a particular cable that is to be retrieved, especially when this cable is in the vicinity of other cables, a slowly varying current, for identification purposes, is produced at a land terminal station and is applied to the desired cable. The detector is designed to respond to the presence of this current by transmitting the above-mentioned acoustic signals through the water to the receiver carried by the cable-recovery ship.

The grapnel is provided with a sensing device or tension indicator which responds to the actual engagement of the grapnel with the cable and functions to transmit other acoustic signals through the water to the ship. The reception of these signals serves to notify the ship's crew that the cable has been hooked and is ready to be hauled up.

Failure to receive these second signals shortly after the reception of the signals from the detector is an indication that the grapnel has failed to engage the cable. In this event, the captain can immediately send an order for the ship to be turned around so that another try for the cable can be made promptly.

When a cable that is to be retrieved is located near another cable, means are provided for normally maintaining the grapnel in an inoperative condition. Then, when the above-mentioned detector is operated, its signals can be utilized to render the grapnel operable, or, if desired, signals for performing this function can be transmitted from the ship. If the grapnel should fail to engage the cable, other signals can be sent from the ship for the purpose of again placing the grapnel in an inoperative condition.

In a modified form of the invention, the grapnel is provided with locking means for holding and retaining a cable after it has been hooked by the grapnel.

These and other features of the invention are more fully discussed in connection with the following detailed description of the drawing in which:

FIG. 3 is a sectional side view of the grapnel and the tension indicator for sensing the engagement of the grapnel with a cable;

FIG. 4 is a schematic circuit diagram of the control means for arming and disarming the grapnel;

Figure 1:
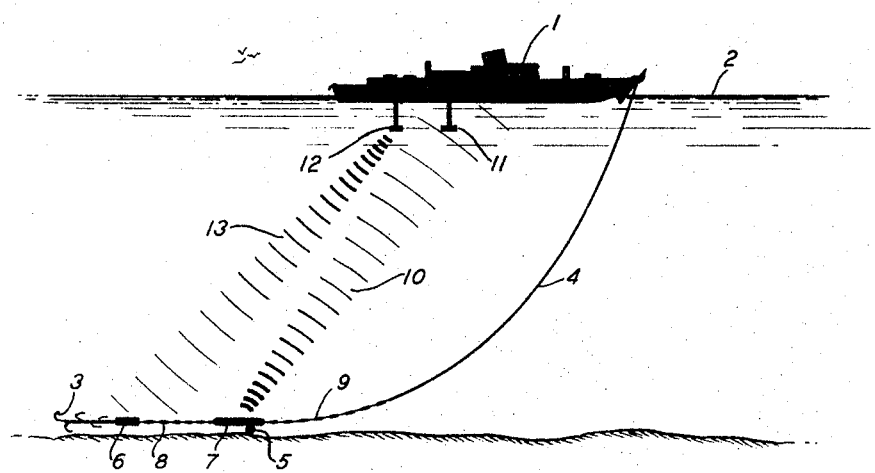
FIG. 1 is a pictorial representation of a cable-recovery ship towing improved grappling equipment in accordance with this invention and illustrating symbolically the transmission of signals from the cable detector through the water to the ship and also the transmission of signals from the ship for arming the grapnel.

In FIG. 1, a cable-recovery ship 1 is represented as sailing on a body of water 2 while dragging a grapnel 3 by means of a suitable rope 4 which may be made of steel wire, if desired. The cross-sectional end of a cable 5, which is to be recovered, is represented as being on the floor of the body of water 2. In accordance with the invention, the grapnel 3 is provided with a tension indicator 6 for sensing the engagement of the grapnel 3 with the cable 5. Located about fifty feet in advance of the tension indicator 6 is a detector 7 for sensing the presence of the cable 5. Since the detector 7 is designed to respond to the presence of a magnetic object, it is connected to the tension indicator 6 by a chain 8 made of non-magnetic material, such as a beryllium copper alloy. An equal length of a similar chain 9 is used to connect the detector 7 to the steel rope 4.

During grappling operations, the grapnel 3 is dragged in the vicinity of the estimated location of the cable 5. When the detector 7 approaches the cable 5, it responds by transmitting acoustic signals 10 through the water. These signals 10 are received by a suitable receiver 11, such as a hydrophone, carried by the ship 1. The receiver 11 is designed to respond to the signals 10 by producing an indication thereof for the purpose of informing the ship's crew that the grapnel 3 is near the cable 5.

As was stated above, if the cable that is to be retrieved is located near another cable, it is desirable to maintain the grapnel 3 normally in a disarmed, or inoperative, condition. Then, when the detector 7 responds to the presence of the desired cable 5, its signals 10 can be used to arm the grapnel 3. Alternatively, the ship 1 can be provided with a transmitter 12 for transmitting other acoustic signals 13 through the water 2 to the grapnel 3 as is represented in FIG. 1. In either case, the grapnel 3 can be designed to receive one type of signals 10 or 13 and to respond by placing itself in an armed, or operative, condition.

Figure 2:
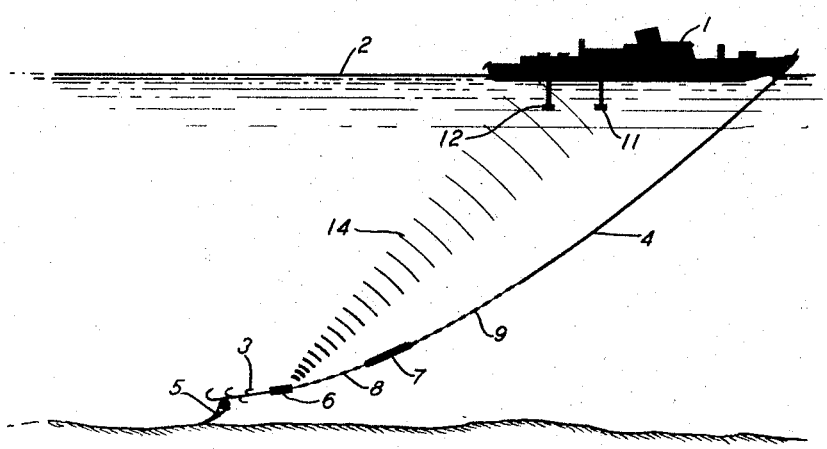
FIG. 2 is a similar pictorial representation of the cable-recovery ship and shows symbolically the transmission of signals from the grapnel through the water to the ship for indicating the engagement of the grapnel with the cable.

When the grapnel 3 catches, or engages, the cable 5, its tension indicator 6 becomes operated and transmits a third type of acoustic signals 14 through the water 2, as is represented in FIG. 2, to the receiver 11 carried by the ship 1. This serves to notify the ship's crew that the cable 5 has been hooked and is ready to be hauled up.

Figure 12:
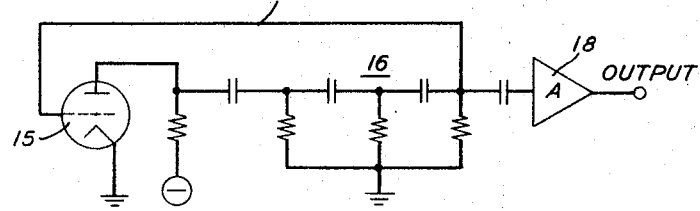
FIG. 12 is a circuit diagram of the means for impressing a slowly varying current upon a cable for identification purposes.

In order to assist the detector 7 in performing its function of locating the desired cable 5, especially when other cables are in its vicinity, the cable 5 is supplied with a slowly varying current that is produced at a land terminal station by any suitable means known to those skilled in the art. One such means is the conventional oscillator circuit shown in FIG. 12 wherein an oscillator 15 has its output applied to a phase shift circuit 16 connected by a feedback path 17 to the grid of the oscillator 15. This produces a slowly varying current which is amplified by an amplifier 18 and is then applied in any convenient manner at the terminal station to an electric conductor in the cable 5.

Figure 11:
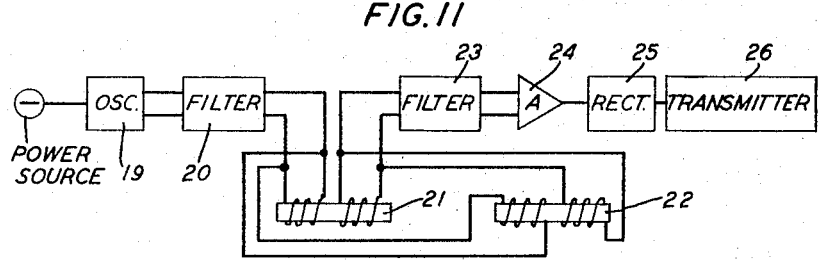
FIG. 11 is a block diagram of the electric components of the detector for sensing the presence of a desired cable.

The presence of this current in the cable 5 during grappling operations serves to activate the detector 7 which may be of any appropriate design known to those skilled in the art. For example, a suitable detector would be one which employed principles of operation that are disclosed in such patents as 2,485,931, issued October 25, 1949 to T. Slonczewski, and 2,996,663, granted August 15, 1961 to J. G. Ferguson. For illustrative purposes, a simplified block diagram of the detector 7 is represented in FIG. 11 which shows an oscillator 19 having its output applied to a filter 20 designed to pass a signal frequency. The output from the filter 20 is supplied to a primary winding on a first core 21 and also to a primary winding on a second core 22. Each of the cores 21 and 22 has a secondary winding and these two secondary windings are connected in series opposition to the input of a filter 23 which is designed to pass the second harmonic of the signal frequency.

In other words, the cores 21 and 22 function as magnetic detectors having their output coils, or secondary windings, connected in opposite phase. Thus, when their ambient fields are exactly equal, they will nullify each other to produce a zero output. However, if there is a magnetic gradient between them, then they will supply a useful input to the filter 23. The output from the filter 23 is amplified in an amplifier 24, rectified in a rectifier 25, and is then used to control the operation of a conventional transmitter 26 which sends the above-mentioned acoustic signals 10 through the water 2 to the receiver 11 carried by the ship 1. It is to be understood that all of these components of the detector 7 are enclosed within a water-tight cylindrical container or housing made of suitable material and attached to the beryllium cooper chains 8 and 9 described above.

At the beginning of the process of grappling for the cable 5, the detector 7 will probably not be in the immediate vicinity of the cable 5. Under this condition, the ambient fields of the cores 21 and 22 will probably be the same or equal. Accordingly, their secondary windings will contain second harmonics of the signal frequency which will be of equal amplitude but of opposite phase so that they will cancel each other with the result that there will now be no output from the filter 23. When the detector 7 is finally dragged into proximity to the cable 5, the above-mentioned varying current that is being sent over the cable 5 will be picked up by the cores 21 and 22 and will cause the second harmonics to be unsymmetrical so that they will not now cancel each other. This, in turn, will cause the filter 23 to produce an output for effecting the operation of the transmitter 26 to inform the ship's crew that the grapnel 3 is near the cable 5.

Let it now be assumed that the grapnel 3 is not equipped with arming and disarming means but, instead, is provided with conventional hooks. In this case, after the signals 10 from the detector 7 have been received, the grappling process is continued for a short period of time. If the grapnel 3 fails to catch the cable 5, then its tension indicator 6 will not be operated and it will not send any signals 14 to the ship 1. This serves as an indication to the ship's crew that the grapnel 3 has failed to engage the cable 5. The captain will consequently order the ship 1 to be turned around so that grappling operations can be undertaken in the opposite direction while the ship 1 is still in the vicinity of the cable 5.

When the grapnel 3 succeeds in hooking the cable 5, the weight of the long length of the cable 5 will apply tension to the grapnel 3. This tension will function to operate the tension indicator 6 which will now be described with reference to FIG. 3. In FIG. 3, the grapnel 3 and the tension indicator 6 are represented as being both incorporated in a cylindrical body structure 27 having two major parts 28 and 29 which are both made of a suitable non-magnetic material. The left body portion 28 supports the grapnel 3 which comprises a plurality of hooks 31 that are described hereinafter. The right body portion 29 holds the tension indicator 6 and is provided at its right end with a member 32 having an eye 33 formed therein so that an end of the chain 8 can be attached thereto.

The left end of the right body portion 29 is so shaped as to constitute a stub 36 which fits closely inside a cavity formed in the right end of the left body portion 28. The fit is not too close to prevent the stub 36 from sliding back and forth within the cavity. In order to prevent the creation of a vacuum during this sliding movement, the cavity is proivded with a suitable vent 37.

The right body portion 29 is provided with a cylindrical chamber 34 containing a suitable fluid 35. The right end of the left body portion 28 is formed with a cylindrical projection 38 which functions as a piston rod. This piston rod 38 passes through a hole in the stub 36 and extends into the fluid chamber 34 where it is attached to a piston 39. The right end of the chamber 34 is provided with a vent 41. The stub 36 and the piston 39 are equipped with convenitonal seals 42 to prevent loss of the fluid 35.

Thus, the stub 36 and the piston rod 38 serve to slidably couple together the left and right body portions 28 and 29. These body portions 28 and 29 cannot become completely detached from each other because the diameter of the piston 39 is larger than the diameter of the passage through the stub 36.

Around the walls of the fluid chamber 34 are a number of small cavities 43 each containing a small piston 44. It should be noted that the size of each of the pistons 44 is different from the sizes of the other pistons 44. Each of the pistons 44 has a short piston rod 45 adapted to slide in a reduced portion of its respectively associated cavity 43. At the end of this reduced portion of each of the cavities 43 is a pair of electric contacts 46. These contacts 46 are normally open because their associated piston rods 45 each have a spring 52 coiled around them for forcing their associated pistons 44 toward the mouths of the cavities 43.

Each pair of contacts 46 has one contact connected to ground and the other contact connected to a respectively different point in a series circuit containing a plurality of resistors 47 which constitute a frequency control circuit for an oscillator 48. The oscillator 48 is adapted to be operated by current from a battery 49 which is connected to ground. The output from the oscillator 48 is used for controlling the operation of a transmitting hydrophone 51 which is adapted to send acoustic signals 14 through the water 2. Although some of the above-mentioned components are illustrated as being outside the body portion 29, it is to be understood that this has been done to obtain clarity in the drawing and that all of these components are actually positioned inside the body portion 29.

When the grapnel 3 hooks the cable 5, the weight of the long length of the cable 5 will exert a drag force upon the grapnel 3 and will tend to retard its forward movement. In other words, this rearward-acting drag force is in opposition to the forward-acting towing force applied by the rope 4 and the chains 8 and 9. For example, in FIG. 3, the cable's drag force tends to pull the left body portion 28 toward the left while the ship's towing force pulls the right body portion 29 toward the right. These opposing forces produce a resultant force which acts to cause the piston rod 38 to slide toward the left thereby forcing the piston 39 to compress the fluid 35.

The resulting fluid pressure is exerted against the small pistons 44. The largest of the pistons 44 will be the first to respond and it will be forced back against its spring 52 thus causing its piston rod 45 to close its associated pair of contacts 46. This applies ground to the frequency control circuit comprising the resistors 47 thereby activating the oscillator 48 which, in turn, causes the transmitting hydrophone 51 to send acoustic signals 14 through the water 2.

When the fluid pressure increases, the next largest piston 44 will be operated and its piston rod 45 will close its associated pair of contacts 46. In turn, this closes a shunt path across one of the resistors 47 which is thus taken, in effect, out of the frequency control circuit of the oscillator 48. This changes the frequency of the electric wave energy generated by the oscillator 48 which, in turn, produces a change in the acoustic signals 14 transmitted by the hydrophone 51. This procedure is repeated until there is no further compression of the fluid 35. Thus, the reception of the acoustic signals 14 serves to inform the ship's crew that the grapnel 3 has hooked the cable 5 and also provides indications of the degree of tension that is being applied to the grapnel 3.

Let it now be assumed that the grapnel 3 is provided with arming mechanism which is normally in a condition for rendering the grapnel 3 incapable of hooking any object. In other words, its hooks 31 are normally disarmed. This feature is especailly useful when the cable 5 that is to be retrieved is close to one or more other cables. Accordingly, the left body portion 28, which is made of a suitable non-magnetic material as was stated above, is provided with an axial bore 53 as is shown shown in FIG. 3. At its right end, the bore 53 is encircled by a solenoid 54. A similar solenoid 55 is disposed around the left end of the bore 53.

A plunger 56 of an appropriate magnetic material is inserted within the bore 53 for sliding movement therein under the control of the solenoids 54 and 55. Near the right end of the plunger 56, two slots 57 and 58 are cut therein for alternatively receiving a key member 59 which is adapted to be operated by a small solenoid 61. This key 59 functions to lock the grapnel hooks 31 in either their armed condition or their disarmed condition as is explained hereinafter.

Figure 10:
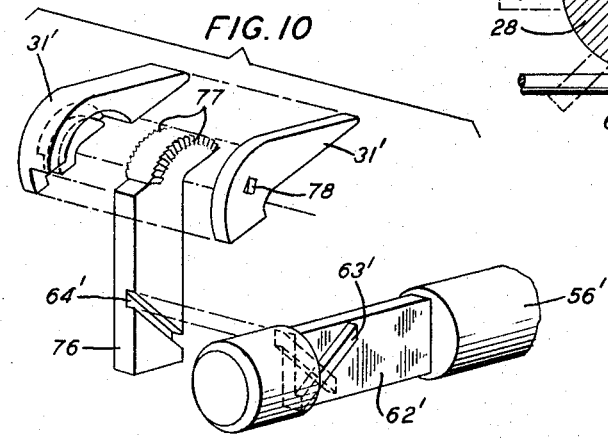
FIG. 10 is a three-dimensional exploded view of the arming and locking mechanism for a portion of the grapnel shown in FIG. 6.

At a short distance from its left end, the sides of the plunger 56 are cut away so as to provide an area having two flat sides 62 similar to the side 62' shown in FIG. 10. These flat sides 62 are each provided with a cam member 63 disposed in a slanting position thereon as is sown in FIG. 5. It is to be noted that one cam 63 slants in one direction and the other cam 63 slants in the opposite direction.

Each of the hooks 41 of the grapnel 3 has a camming slot 64 cut therein in a manner similar to the camming slot 64' shown in FIG. 10. The size of each slot 64 corresponds to the size of its associated cam 63 so that the cam 63 can slide therein. Each slot 64 is cut at a slanting angle so as to conform to the angle of its respectively associated cam 63. The hooks are located in slots 65 cut in the left body portion 28. Each of the slots 65 has a narrow portion for accommodating the shank of its associated hook 31 and also has a broader portion for receiving the prong of the hook 31.

The operation of this arming mechanism is controlled by means of a control circuit that is shown in FIG. 4. This circuit includes the solenoids 54, 55, and 61 that were mentioned above. The arming solenoid 54 is connected through a delay circuit 66 to a contact of a relay 67 which is of the slow-to-release type. The disarming solenoid 55 is connected through a similar delay circuit 68 to a contact of another slow-to-release relay 69. The locking solenoid 61 is connected in parallel to a contact of each of the relays 67 and 69.

The normally unoperated armatures of the relays 67 and 69 are connected to a battery 71. The energizing winding of relay 67 has one side connected to ground and its other side connected through a filter 72 to a receiving hydrophone 73 which is mounted in the right end of the right body portion 29 as is shown in FIG. 3. The energizing winding of relay 69 has one side connected to ground and its other side connected through a different filter 74 to the receiving hydrophone 73. The filters 72 and 74 are tuned to pass different outputs produced by the hydrophone 73 when it receives signals transmitted through the water 2.

Figure 5:
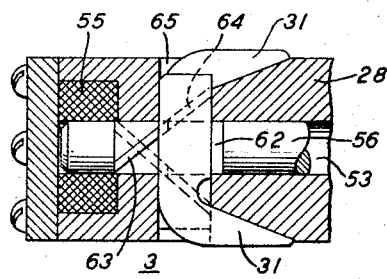
FIG. 5 is a side view in section of a portion of the grapnel having its hooks retracted so that the grapnel is in a disarmed condition.

Normally, the grapnel 3 is in its disarmed condition with its hooks 31 retracted into their slots 65, as is represented in FIG. 5, so that they are unable to engage a cable. In this condition, the plunger 56 has moved to the left end of the left body portion 28 as is shown in FIG. 5. The plunger 56 is locked in this position by the engagement of the key 59 with the slot 58.

When the magnetic detector 7 is dragged into the vicinity of the cable 5, it responds by transmitting acoustic signals 10 through the water 2 as was explained above. If desired, the hydrophone 73 can be designed to receive these signals 10 and to produce an output therefrom which will pass through the filter 72 but not through the filter 74. Alternatively, the hydrophone 73 can be designed to receive the above-mentioned acoustic signals 13 transmited through the water 2 from the transmitter 12 carried by the ship 1. In this event, the filter 72 would be designed to pass the output from the hydrophone 73 while the filter 74 would not.

In either case, the electric wave output from the filter 72 is applied to the energizing winding of the relay 67 which responds by operating its armature to supply its contacts with current from the battery 71. Accordingly, current from battery 71 will energize the small solenoid 61 which consequently retracts the locking key 59 from the slot 58. After a short delay provided by the delay circuit 66, the arming solenoid 54 is energized by current from the batery 71. This causes the plunger 56 to slide toward the right in FIG. 3.

When the transmission of the acoustic signals 10 or 13 is terminated, the output from the hydrophone 73 will cease and the relay 67 will release its armature. Its contacts are so designed that the lower contact is opened before the upper contact. Therefore, the small solenoid 61 will release the key 59 shortly before the arming solenoid 54 is de-energized. The key 59 is biased by a small spring 75 which now forces the key 59 into the slot 57. This serves to lock the plunger 56 in the position shown in FIG. 4 thus locking the grapnel 3 in its armed condition.

While the plunger 56 was moving from its disarming position, shown in FIG. 5, to its arming position, shown in FIG. 3, its cams 63 were moving in the slots 64 in such a direction as to force the grapnel hooks 31 out of their slots 65. In other words, the hooks 31 were pushed out of their retracted positions, shown in FIG. 5, and were placed in their extended positions, shown in FIG. 3. This arming of the grapnel 3 places the hooks 31 in positions where they will be able to engage the cable 5 in the manner represented in FIGS. 3 and 9. After the cable 5 has been caught, the resulting tension applied by the long length of the cable 5 to the grapnel 3 will function to operate the tension indicator 6 in the manner described above.

If the grapnel 3 fails to hook the cable 5, then it will be necessary to turn the ship 1 around and make a grappling attempt from the opposite direction. During this turning procedure, it will be desirable, if there are other cables in the vicinity, to disarm the grapnel 3 so that it will not hook an unwanted cable. The disarming of the grapnel 3 is accomplished by operating the ship's transmitter 12 for sending other acoustic signals through the water 2. Reception of these other acoustic signals by the hydrophone 73 will cause it to produce an output which will not be passed by the filter 72 but which will be passed by the filter 74 to energize the relay 69.

Relay 69 now operates its armature to supply its contacts with current from the battery 71. This current energizes the small solenoid 61 and causes it to retract the key 59 thereby unlocking the plunger 56. After a short delay provided by the delay circuit 68, the disarming solenoid 55 becomes energized and causes the plunger 56 to slide to the left to the position shown in FIG. 5. This movement of the plunger 56 causes its cams 63 to slide in the slots 64 in such a manner as to pull the hooks 31 inward to their disarmed positions shown in FIG 5.

At the end of the transmission of these acoustic signals, the output from the hydrophone 73 will be terminated and the relay 69 will release its armatures. This will permit the spring 75 to push the key 59 into the slot 58 thereby locking the grapnel 3 in its disarmed condition. Then, when the detector 6 again locates the cable 5, it will again transmit the acoustic signals 10 so that the above-described arming process can be repeated. Although some of the above-mentioned components of the arming and disarming control circuit are illustrated as being outside the body structure 27, it is to be understood that this has been done in order to provide clarity in the drawing and that all of these components are actually positioned inside the body structure 27.

Figure 9:
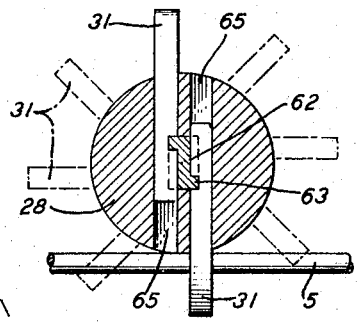
FIG. 9 is an end view partly in section and partly in phantom taken along the line 9—9 in FIG. 3 and showing the grapnel in engagement with a portion of a cable.

Although the grapnel 3 has been represented as having only two hooks 31, it could actually be equipped with a number of other hooks 31 as is indicated in FIG. 9. These additional hooks 31 would be similar to the above-described hooks 31 but would be located in pairs at spaced intervals along the length of the plunger 56. It would be desirable for them to be at different angles as is indicated in FIG. 9 and this can be accomplished by constructing their associated camming means in such a manner as to provide the desired angular arrangement. In other words, the plunger 56 would have several flat sides, similar to the sides 62, cut in it at intervals along its length but these additional flat sides would be cut at different angles so as to provide the arrangement of hooks 31 that is shown in FIG. 9.

Figure 6:
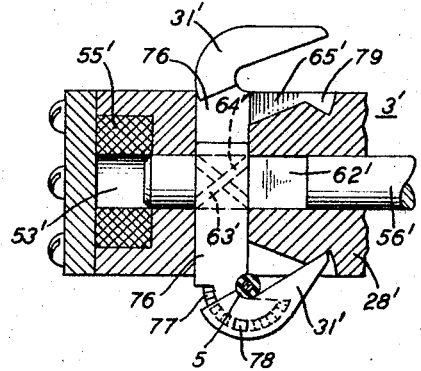
FIG. 6 is a sectional side view of a portion of a modified grapnel having one of its hooks locked against an engaged cable.

In order to prevent the cable 5 from slipping out of engagement with a grapnel after it has been hooked, a modified form of the grapnel 3 is represented in FIGS. 6 and 10 as being provided with locking or clamping means for holding and retaining the cable 5 after it has been hooked. This improved grapnel 3' is constructed in a manner similar to the grapnel 3 except that its upper and lower hooks 31' are mounted on supports 76, each of which has two sets of ratchet teeth 77 cut along its top edges as is shown in FIG. 10. Each support 76 has a camming slot 64' for cooperating with a cam 63' formed on a flat side 62' of a plunger 56' similar to the previously described plunger 56. As is shown in FIG. 6, a disarming solenoid 55', comparable to the solenoid 55, is located at the left end of the left body portion 28'. The grapnel 3' is provided with a locking key member like the key 59 and is also equipped with an arming solenoid and a locking solenoid similar to the solenoids 54 and 61.

Each hook 31' is formed of two nearly similar parts which are placed over the top of the support 76 and are then securely fastened together in any suitable manner. Each of these parts of the hook 31' is provided with a ratchet pawl 78 which is so positioned as to cooperate with the associated ratchet teeth 77 on the support 76. Thus, the two parts of each hook 31' are designed to fit over the top of the support 76 in such a manner that they are securely coupled thereto while being free to swing about it. In order to accommodate this swinging movement, each support 76 is mounted in a slot 65' which, as is shown in FIG. 6, has a notch 79 adapted to receive the tip of its associated hook 31'.

These hooks 31' are armed and disarmed in the same manner as the hooks 31. Assuming that the grapnel 3' is in its disarmed condition, it can be placed in its armed condition by energizing its locking solenoid for retracting the key similar to the key 59 and then energizing its arming solenoid which causes the plunger 56' to slide toward the right in the bore 53'. This movement of the plunger 56' causes the cams 63' to slide in their slots 64' in such a manner as to push the hook supports 76 so that they protrude out of their slots 65'. In so moving, the supports 76 carry the prongs or hooks 31' outward to open positions represented by the upper hook 31' in FIG. 6. Thus, the hooks 31' are moved from closed, or retracted, positions inside the slots 65' to open positions outside the body member 28'.

When it is desired to disarm the grapnel 3', the locking solenoid is energized to retract the locking key like the key 59 and the disarming solenoid 55' is then energized. This causes the plunger 56' to slide to the left in the bore 53' thereby forcing the cams 63' to slide in their slots 64' in such a manner as to pull the hook supports 76 inward toward the center of the grapnel 3'. The supports 76 thus pull the hooks 31' into their slots 65' where they assume closed positions similar to those of the hooks 31 in FIG. 5.

When the grapnel 3' is in its armed condition and one of the hooks 31' engages the cable 5, the cable 5 will apply tension to the inner curved edge of one of the hooks 31'. The contour of this curved edge near the base of the hook 31' is so designed that the force exerted by the cable 5 will cause the hook 31' to rotate inwardly with the top of its support 76 acting as a pivot and with its detent 78 moving step-by-step over the ratchet teeth 77. This causes the tip of the hook 31' to swing inward into the associated notch 79 as is illustrated by the position of the lower hook 31' in FIG. 6. Thus, the cable 5 is locked or clamped by the hook 31' so that the cable 5 is securely held by the grapnel 3'. After the cable 5 is caught and held, the grapnel 3' is pulled on board the ship 1, carrying with it the cable 5. The cable 5 is then grasped so as to remove the cable tensile load from the grapnel 3'. This removes the pressure from the inner curved edge of the hook 31 so that the hook 31 can be pushed back to its open position thereby permitting the cable 5 to be removed therefrom.

Figure 7:
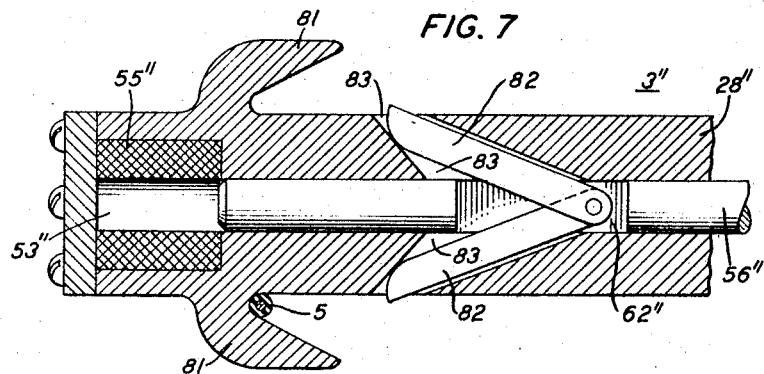
FIG. 7 is a side view in section of a portion of another modified grapnel having an alternative form of arming and locking mechanism and showing the grapnel in an armed condition.
Figure 8:
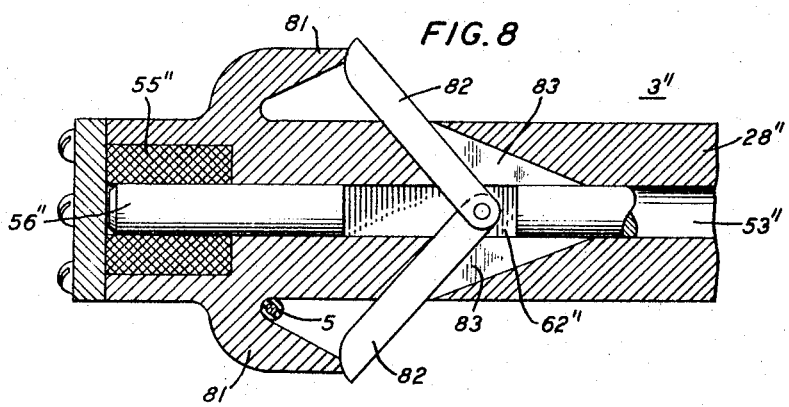
FIG. 8 is a sectional side view showing the modified grapnel of FIG. 7 in its disarmed condition and locked against an engaged cable.

Another modified form of the grapnel 3 is represented as the grapnel 3" which is shown in FIGS. 7 and 8. This grapnel 3" is provided with an alternative form of arming and locking mechanism. The grapnel 3" comprises a bore 53", a plunger 56", and a solenoid 55" similar to those of the grapnel 3. However, its hooks 81 are immovable and may, if desired, be an integral part of the body member 28". The plunger 56" is formed with a cut-out portion having a flat side 62". A pair of retractable fingers 82 are pivotally attached to the flat side 62". Each of these fingers 82 is adapted to slide in and out of a camming slot 83 cut in the body member 28". Although they are not shown in the drawing, the grapnel 3" is provided with an arming solenoid and a locking solenoid similar to the solenoids 54 and 61.

The grapnel 3" is placed in a disarmed condition by energizing its disarming solenoid 55" in the same manner as was described above for the solenoid 55. This pulls the plunger 56" to the left and it is locked in this position by a key similar to the key 59. The movement of the plunger 56" forces the fingers 82 to slide partly out of the camming slots 83 to an extent that is sufficient for the ends of the fingers 82 to come into engagement with the tips of the hooks 81 as is shown in FIG. 8. This blocks the openings to the hooks 81 so that they cannot catch anything and are thus disarmed.

The arming of the grapnel 3" is accomplished by energizing its arming solenoid in the same manner as for the solenoid 54. This causes the plunger 56" to slide to the right where it is retained in this position by the key that is similar to the key 59. In so moving, the plunger 56" pulls the fingers 82 back inside the camming slots 83 as is shown in FIG. 7. This unblocks the openings to the hooks 81 so that they are now in their armed condition suitable for engaging the cable 5.

After the cable 5 has been hooked, it is held or retained by again energizing the disarming solenoid 55". The plunger 56" now slides to the left thereby forcing the fingers 82 to move outward so as to bring their ends into engagement with the tips of the hooks 81. This serves to lock the cable 5 inside the engaged hook 81 as is represented in FIG. 8.

What is claimed is:

1. Cable-retrieving equipment comprising in combination:

a grapnel adapted to engage a cable and also adapted to be subjected to tension applied thereto by a cable engaged therewith, and signalling means carried with said grapnel for providing indications of said tension applied to said grapnel, said signalling means including instrumentalities for varying the characteristics of said indications in accordance with variations in the magnitude of said tension, said instrumentalities comprising a plurality of pressure-responsive means, and means attached to said grapnel for selectively actuating said pressure-responsive means in response to variations in the magnitude of said tension.

2. Equipment for retrieving a cable lying at the bottom of a body of water, said equipment comprising a ship on the surface of said body of water, a grapnel at the bottom of said body of water, means extending from the ship to the grapnel for applying a forward-acting force to the grapnel for dragging the grapnel along the bottom of the body of water, said grapnel having at least one hook adapted to engage the cable, said cable being adapted to apply tension in the form of a rearward-acting force to the grapnel after said hook engages the cable, said equipment being characterized by having tension signaling means comprising in combination:

means attached to said grapnel for combining said oppositely directed forces for producing a resultant force that is indicative of said tension applied by the cable to the grapnel, detecting means carried by said grapnel for detecting the magnitude of said tension resultant force, and signal transmitting means carried by said grapnel and adapted to be operated by the detection of said tension resultant force by said detecting means for transmitting acoustic signals indicative of said tension resultant force through the body of water to the ship.

3. Equipment for retrieving a cable lying at the bottom of a body of water, said equipment comprising a ship on the surface of said body of water, a grapnel at the bottom of said body of water, means extending from the ship to the grapnel for applying a forward-acting force to the grapnel for dragging the grapnel along the bottom of the body of water, said grapnel having at least one hook adapted to engage the cable, said cable being adapted to apply tension in the form of a rearward-acting force having varying degrees of magnitude to the grapnel after said hook engages the cable, said equipment being characterized by having tension signaling means comprising in combination:

means attached to said grapnel for combining said oppositely directed forces for producing a resultant force that is indicative of said tension applied by the cable to the grapnel, detecting means carried by said grapnel for detecting the instantaneous magnitude of said tension resultant force, signal transmitting means carried by said grapnel and adapted to respond to the detection of said tension resultant force by said detecting means for transmitting acoustic signals indicative of said tension resultant force through the body of water to the ship, and central means carried with said grapnel for varying the characteristics of said signals in accordance with variations in the magnitude of said tension resultant force.

4. Equipment for retrieving a particular one of several similar cables lying in the same vicinity at the bottom of a body of water, said particular cable being identifiable by having impressed thereon electric wave energy having an assigned characteristic, said equipment comprising a grapnel adapted to engage a cable for the purpose of retrieving it, instrumentalities for assisting said grapnel to engage said particular cable, said instrumentalities including means carried with said grapnel for detecting the presence of said electric wave energy in said particular cable, and means also carried by said grapnel and adapted to be actuated by the detection of said electric wave energy for transmitting underwater acoustic signals indicative thereof.

5. Equipment for retrieving a cable lying at the bottom of a body of water, said equipment comprising a ship on the surface of said body of water, a grapnel on the bottom of said body of water and adapted to engage a cable for the purpose of retrieving it, connecting means for connecting said grapnel to said ship whereby movement of said ship across said surface produces movement of said grapnel along said bottom, and instrumentalities for assisting in the retrieval of said cable by said grapnel, said instrumentalities including detecting means carried by said connecting means for detecting the presence of a cable, said detecting means including first signal transmitting means responsive to the detection of the presence of a cable for transmitting first signals through said body of water to said ship for indicating thereat the detection of said cable, sensing means carried by said connecting means for sensing the engagement of said grapnel with a cable, said sensing means including second signal transmitting means responsive to the operation of said sensing means for transmitting second signals through said body of water to said ship for indicating thereat the engagement of said cable by said grapnel, said second signals being distinctively different from said first signals, and signal receiving means carried by said ship and adapted for receiving said first and second signals.

6. Cable-retrieving equipment comprising in combination:

a grapnel adapted to engage a cable, said grapnel including a body portion adapted for supporting at least one hook having a normally open portion adapted to receive therein an engaged cable, and locking means for preventing an engaged cable from slipping out of said normally open portion of said hook, said locking means including a member adapted for closing said normally open portion of said hook, said member being normally out of engagement with said hook and retracted within said body member, and an electromagnetically operated instrumentality for ejecting at least a portion of said member out from said body member and into engagement with said hook whereby said normally open portion becomes closed.

7. Cable-retrieving equipment comprising in combination:

a grapnel adapted to engage a cable lying on the bottom of a body of water, said grapnel including at least one hook fixedly mounted on said grapnel and having a normally open portion adapted to receive therein an engaged cable, and locking means for preventing an engaged cable from slipping out of said normally open portion of said hook, said locking means including a member slidably mounted in said grapnel and adapted for closing said normally open portion of said hook, said member being normally out of engagement with said hook, an electromagnetically operated instrumentality in said grapnel for effecting the movement of said member into engagement with said hook whereby said normally open portion becomes closed, said grapnel having a hydrophone attached thereto and adopted for receiving acoustic signals transmitted through said body of water, and electroresponsive means attached to said grapnel and responsive to the reception by said hydrophone of acoustic signals of a preassigned character for effecting the operation of said instrumentality.

8. The method of employing a cable-recovery ship and cable-retrieval equipment for retrieving a cable lying at the bottom of a body of water, said ship being on the surface of said body of water and at least a portion of said equipment including a grapnel being on the bottom of said body of water and being dragged thereover by said ship, said grapnel including at least one hook having an open portion, said method being characterized by utilizing the following steps for expediting the retrieval of said cable:

detecting with underwater detecting means the approach of the grapnel to the cable, transmitting a first type of acoustic signals from said underwater detecting means through the water to the ship for indicating that said detection has been performed, engaging the cable with the grapnel, transmitting a second type of acoustic signals from the grapnel through the water to the ship for indicating that said engagement has been accomplished, transmitting from the ship other acoustic signals through the water to the grapnel, receiving said other acoustic signals at said cable-retrieving equipment, and utilizing said received signals for effecting the locking of the cable in said open portion after said cable has been engaged by said hook.

9. The method of employing a cable-recovery ship and cable-retrieval equipment for retrieving a cable lying at the bottom of a body of water, said ship being on the surface of said body of water and at least a portion of said equipment including a normally disable grapnel being on the bottom of said body of water and being dragged thereover by said ship, said method being characterized by utilizing the following steps for expediting the retrieval of said cable:

detecting with underwater detecting means carried with said grapnel the approach of the grapnel to the cable, transmitting a first type of acoustic signals from said underwater detecting means through the water to the ship for indicating that said detection has been performed, arming said grapnel after said signals have been transmitted, engaging the cable with the grapnel, and transmitting a second type of acoustic signals from the grapnel through the water to the ship for indicating that said engagement has been accomplished.

References Cited by the Examiner

UNITED STATES PATENTS

| | | | |
|---|---|---|---|
| 726,826 | 4/1903 | Rasmussen | 294—66 |
| 1,374,834 | 4/1921 | Dooley | 294—88 X |
| 1,568,716 | 1/1926 | Boulton | 294—66 |
| 1,854,906 | 4/1932 | Kulik | 61—69 |
| 1,973,719 | 9/1934 | Lake | 61—69 |
| 2,142,135 | 1/1939 | Lawton | 61—72.4 |
| 2,238,072 | 4/1941 | Nelson et al. | |
| 2,355,086 | 8/1944 | Lang | 294—66 |
| 2,613,101 | 10/1952 | Roberson | 294—82 |
| 2,981,074 | 4/1961 | Wilder | 61—72.3 X |
| 2,987,893 | 6/1961 | Robinson | 61—69 |
| 3,020,470 | 2/1962 | Shawhan et al. | 324—3 |
| 3,097,874 | 7/1963 | Brockbank | 294—66 |

EARL J. WITMER, *Primary Examiner.*